US008904329B2

(12) United States Patent
Bickford et al.

(10) Patent No.: US 8,904,329 B2
(45) Date of Patent: Dec. 2, 2014

(54) SYSTEMS AND METHODS FOR SINGLE CELL PRODUCT PATH DELAY ANALYSIS

(71) Applicant: International Business Machines Corporation, Armonk, NY (US)

(72) Inventors: Jeanne P. Bickford, Essex Junction, VT (US); Peter A. Habitz, Hinesburg, VT (US); Vikram Iyengar, Pittsburgh, PA (US); Brian A. Worth, Jericho, VT (US); Jinjun Xiong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/735,392

(22) Filed: Jan. 7, 2013

(65) Prior Publication Data

US 2014/0195995 A1  Jul. 10, 2014

(51) Int. Cl.
*G06F 9/455* (2006.01)
*G06F 17/50* (2006.01)

(52) U.S. Cl.
CPC .................................. *G06F 17/5009* (2013.01)
USPC .......................................................... 716/113

(58) Field of Classification Search
CPC ......................... G06F 17/5031; G06F 17/5036
USPC .......................................................... 716/113
See application file for complete search history.

(56) References Cited

U.S. PATENT DOCUMENTS

| 8,645,881 B1 * | 2/2014 | Kriplani et al. ................. 716/56 |
| 2005/0085932 A1 * | 4/2005 | Aghababazadeh et al. ..... 700/90 |
| 2008/0120065 A1 * | 5/2008 | Joshi et al. ..................... 702/182 |
| 2008/0270953 A1 * | 10/2008 | Foreman et al. .................. 716/4 |
| 2009/0288051 A1 * | 11/2009 | Hemmett et al. ................. 716/6 |
| 2010/0287432 A1 | 11/2010 | Visweswariah et al. |
| 2011/0082657 A1 | 4/2011 | Ito |
| 2011/0301896 A1 | 12/2011 | Ishida |
| 2013/0254731 A1 * | 9/2013 | Bansal et al. ................. 716/113 |
| 2014/0096100 A1 * | 4/2014 | Sinha et al. ................... 716/113 |

FOREIGN PATENT DOCUMENTS

| JP | 2005019524 A | 1/2005 |
| JP | 2011128023 A | 6/2011 |
| KR | 2008021303 A | 3/2008 |

OTHER PUBLICATIONS

Lamech et al. "Rebel and TDC: Two Embedded Test Structures for On-Chip Measurements of Within-Die Path Delay Variations", 2011 IEEE, pp. 170-177.
Specification of U.S. Appl. No. 13/570,285, filed on Aug. 9, 2012, 25 pages, not yet published.
Specification of U.S. Appl. No. 13/572,954, filed on Aug. 13, 2012, 24 pages, not yet published.
Specification of U.S. Appl. No. 13/294,210, filed on Nov. 11, 2011, 26 pages, not yet published.

* cited by examiner

*Primary Examiner* — Suresh Memula
(74) *Attorney, Agent, or Firm* — David Cain; Roberts Mlotkowski Safran & Cole, P.C.

(57) ABSTRACT

Methods and systems for qualifying a single cell with product path delay analysis are provided. A method includes designing a product using a model from an initial test site. The method also includes creating performance path tests for one or more paths on the product. The method further includes measuring performance path parameters of the product. The method includes determining that the measured performance path parameters match predicted performance path parameters.

8 Claims, 8 Drawing Sheets

SYSTEMS AND METHODS FOR SINGLE CELL PRODUCT PATH DELAY ANALYSIS

FIELD OF THE INVENTION

The invention relates to semiconductor devices and, more particularly, to systems and methods for single cell product path delay analysis.

BACKGROUND

Current product qualification methods require multiple test sites on a chip and do not validate design assumptions. More specifically, these qualification methods do not validate the timing methodology of a product; instead, these qualification methods merely test a final product, and if the product operates in its desired manner, the final product passes the qualification. That is, the timing of the final product is assumed to be accurate if the final product works. However, problems may exist in the design model, which are not detected in these qualification methods, and as such, these problems may cause dysfunctional chips in the future, thereby increasing yield lost. To prevent these dysfunctional chips, the design models include excessive amounts of guardband to ensure that the future chips do not fail these qualification methods. Alternatively, these problems in the design model may require a complete redesign of the design model.

Accordingly, there exists a need in the art to overcome the deficiencies and limitations described hereinabove.

SUMMARY

In a first aspect of the invention, a method comprises designing a product using a model from an initial test site. The method also comprises creating performance path tests for one or more paths on the product. The method further comprises measuring performance path parameters of the product. The method comprises determining that the measured performance path parameters match predicted performance path parameters.

In another aspect of the invention, a method comprises establishing a path selection to test. The method also comprises determining a process corner for each chip and measuring at least one of a path delay and a frequency of each chip. The method further comprises comparing data sensitivities based on a regression analysis with timing sensitivities. The method includes adjusting a timing margin setting.

In yet another aspect of the invention, a computer system for qualifying a performance path comprises a CPU, a computer readable memory and a tangible computer readable storage media. The computer system comprises first program instructions to create performance path tests for one or more paths on a product. The computer system also includes second program instructions to measure performance path parameters of the product. The computer system further includes third program instructions to determine that the measured performance path parameters match predicted performance path parameters. The computer system also includes fourth program instructions to adjust a timing margin setting when the measured performance path parameters do not match the predicted performance path parameters. The first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
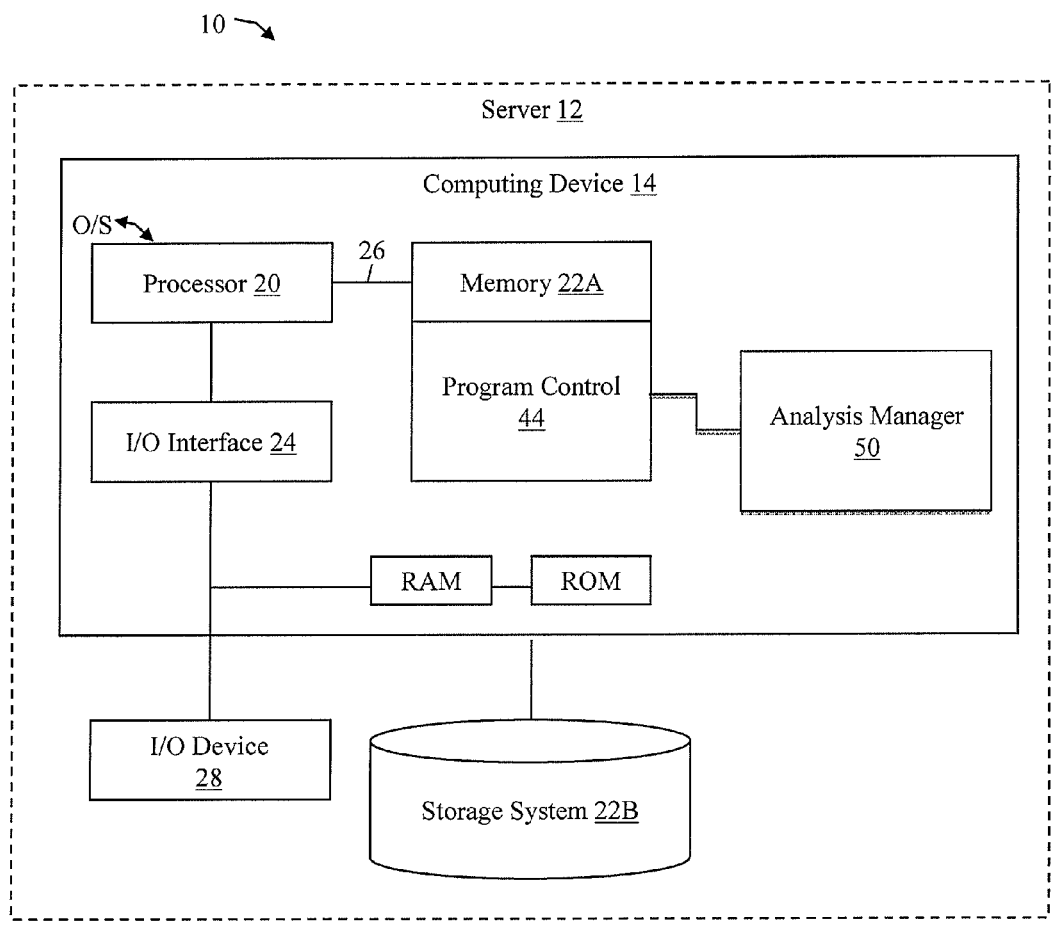
FIG. 1 shows an illustrative environment for implementing steps in accordance with aspects of the present invention.

The invention relates to semiconductor devices and, more particularly, to systems and methods for single cell product path delay analysis. The present invention can be used to advantageously qualify a design of a product. More specifically, the present invention advantageously uses a single test site, e.g., a test site built in a pad cage, rather than full die test sites to test a timing methodology. That is, in aspects of the present invention, a timing methodology of a chip can be qualified for selected products using the initial test site. Moreover, in accordance with aspects of the present invention, the timing of any path of interest of a product can be tested.

In embodiments, the present invention advantageously uses at-speed structural testing (ASST) for model to hardware correlation (MHC), which verifies the library element models used for product timing analysis. ASST augments the need of test chip generation and analysis, and thereby, reduces production costs and processing steps. Furthermore, in accordance with aspects of the present invention, ASST qualifies the library elements as used on final products. To this end, guardband is set to match product requirements. The present invention also advantageously uses a test site to qualify a model, e.g., a spice model application as should be understood by those of ordinary skill in the art. Additionally, the present invention uses ASST to center product applications, and as such, the present invention can advantageously be used for every critical product on a chip to show a consumer customer the quality of a manufacturer's timing approach.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with an external I/O device/resource 28 and a storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an analysis manager 50 that is configured to perform the processes described herein. For example, the analysis manager 50 can be used to determine process window sigma for each die in a sample. Moreover, the analysis manager 50 can compare a measured delay and/or frequency of a selected path with a predicted delay and/or frequency of the selected path. The analysis manager 50 can also conduct regression analysis and compare data sensitivities based on the regression analysis with timing sensitivities. Moreover, the analysis manager 50 can be used to adjust a timing margin setting of a timing methodology.

The analysis manager 50 can be implemented as one or more program codes in the program control 44 stored in memory 22A as separate or combined modules. Additionally, the analysis manager 50 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagrams

FIGS. 2-5 show exemplary flows for performing aspects of the present invention. The steps of FIGS. 2-5 may be implemented in the environment of FIG. 1, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, or communicate the program for use by or in connection with the instruction execution system, apparatus, or device. The medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 2:
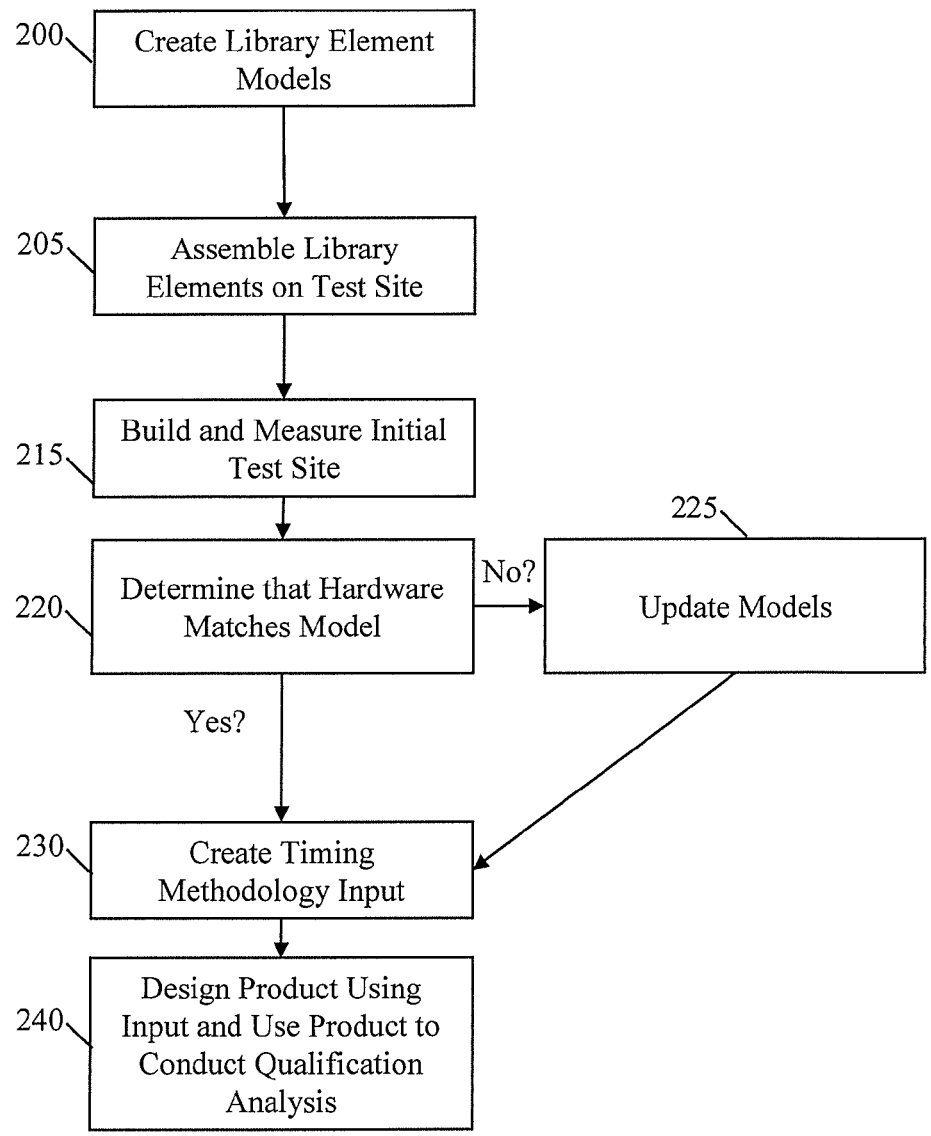
FIGS. 2-5 show exemplary flows for performing aspects of the present invention.

FIG. 2 depicts an exemplary flow for a process in accordance with aspects of the present invention. More specifically, at step 200, the process includes creating library elements, and at step 205, assembling the library elements on a test site. Moreover, the process includes building and measuring an initial test site, at step 215. More specifically, in embodiments, the first test site is a pad cage, as would be understood by those of ordinary skill in the art, and is the only test site created on the chip. In this way, the present invention can be used to reduce processing steps and production costs. In embodiments, the measurements can include parameter values, e.g., physical and/or electrical parameter values, such as effective channel length $L_{eff}$, threshold voltage (Vt), wire width, on-current (Ion), etc. In embodiments, scribe line data can include a resistance (R(Mx)) of a minimum width wire in ohms/1 μm for a given wiring level Mx. A wafer acceptance criteria limit sets+/−3 sigma limits Rbc(Mx) and Rwc(Mx), i.e., a best case resistance of a wiring level and a worst case resistance of a wiring level, respectively.

As further shown in FIG. 2, at step 220, the process further includes determining that hardware, e.g., a chip, matches a design model of the chip by comparing simulated results to hardware measurements. If the hardware does not match the design model, the process includes updating the model, at step 225. If the hardware matches the design, or after updating the model, the process continues at step 230. More specifically, at step 230, the process can include creating a timing methodology input, e.g., a method to test timing of the product. At step 240, the process further includes designing a product using the timing methodology input and using the product to conduct qualification analysis, as will be described in more detail below.

Figure 3:
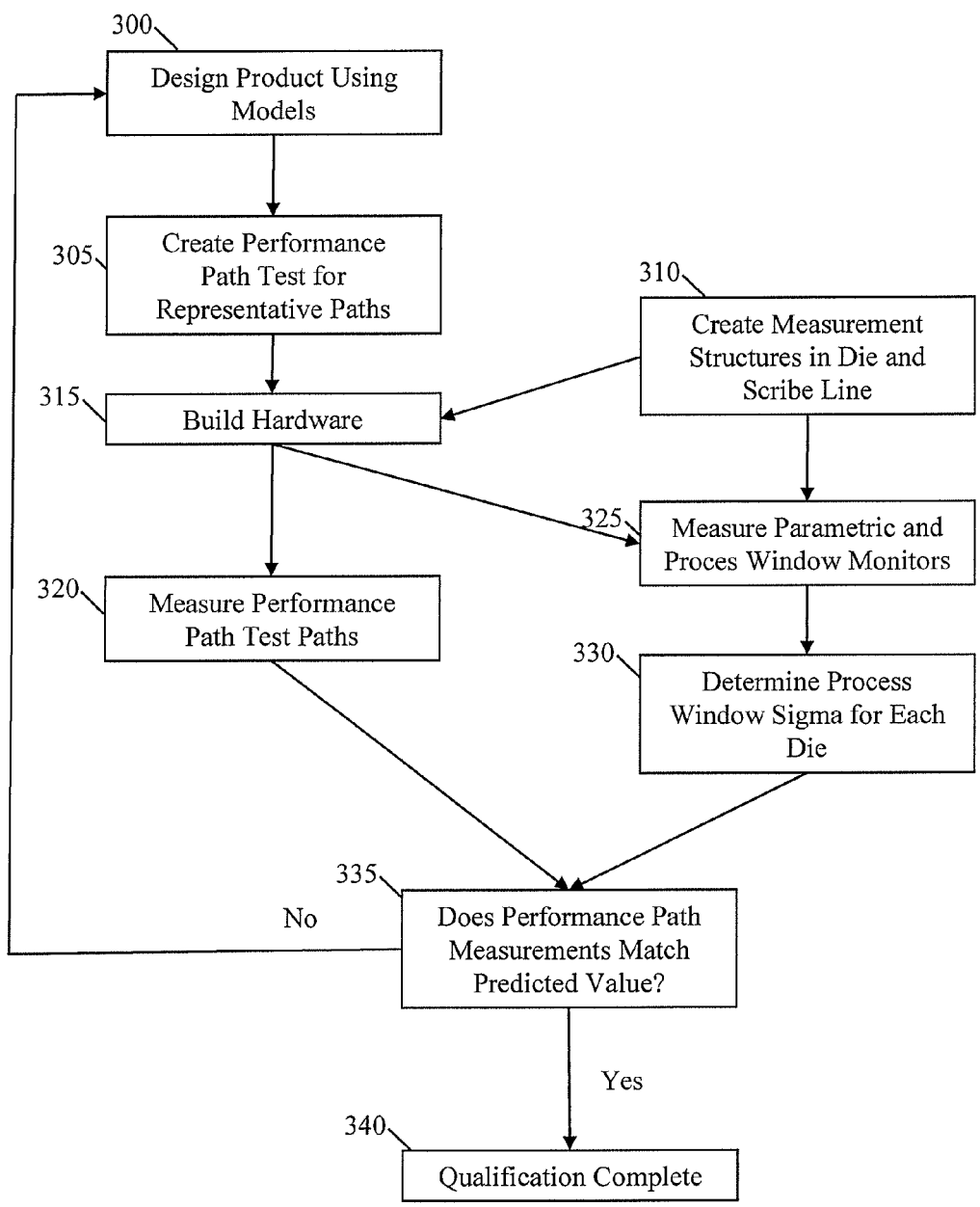

FIG. 3 depicts an exemplary flow for a process in accordance with aspects of the present invention. More specifically, FIG. 3 shows a process for designing a product using the timing methodology input and using the product to conduct qualification analysis. At step 300, the process includes designing products using the models from the first test site. The product design includes structures used to conduct parametric measurements and performance screen ring oscillators (PSRO) measurements. The process further includes creating performance path tests for representative paths, at step 305. In embodiments, the performance path tests can be created for any path of interest. Moreover, creating the performance path test can include determining a delay and/or a frequency of the path as a function of a process window sigma for the delay/frequency. That is, an expected delay and/or frequency can be determined for each selected path.

The performance path test can utilize a critical path of the logic placed within a chip. The critical path is a data path between an input point and an output point where the time delay of the data signal being presented at the input point and received at the output point must be between upper and lower performance specifications. In one example, the input and output points of data paths are latches. A further discussion of the critical path can be found in U.S. application Ser. No. 13/294,210, filed on Nov. 11, 2011, the contents of which are incorporated by reference in their entirety herein.

At step 310, the process includes creating measurement structures in a die and in a scribe line. More specifically, in embodiments, the measurement structures in the die may be a predetermined number of PSROs placed in different configurations across the chip, e.g., a grid pattern. Furthermore, in embodiments, the scribe line test structures may include metal layer resistance and capacitance measurement structures and via resistance measurement structures.

Moreover, at step 315, the process includes building hardware using effective channel lengths $L_{eff}$, oxide thickness, threshold voltage (Vt), wire width, on-current (Ion), etc., and metal/via splits to cover process windows. In embodiments, building the hardware may include artificially moving hardware components to create parametric measures, e.g., changing capacity at front end of the line processes or a wiring thickness. In embodiments, the performance of the hardware can be a composite measurement of these parametric measures. At step 320, the process includes measuring the performance of the selected paths, i.e., the delay/frequency of the selected path.

As further shown in FIG. 3, at step 325, the process can include measuring parametric values and process window monitors. Moreover, at step 330, the process includes determining a process window sigma for each die as should be understood by those of ordinary skill in the art. More specifically, in embodiments, determining a process window sigma for each die includes generating a performance path using a parameter specific sigma.

At step 335, the process further includes determining that the measured, e.g., observed, performance path measurements match the predicted performance path measurements. More specifically, in embodiments, a regression analysis is conducted. The regression analysis determines a best fit of a function through a distribution of values, i.e., the regression analysis can be used to determine a linear equation of the function (i.e., the canonical model).

In embodiments, the canonical model used in timing models can be based on equation 1.

$$\text{cell\_A\_delay} = meanA + \sum_{P}^{N} sA_P * + sA_R * R. \qquad \text{Equation (1)}$$

Where cell_A_delay is a delay of a cell 'A', meanA is a nominal delay of cell 'A', $sA_P$ is a normalize sensitivity of delay A to parameter P, which is a correlated random distribution, $sA_R$ is a normalized sensitivity of delay A to the independently random contribution R. In embodiments, any parameter limit sign combination, i.e., +/−, has a minimum or maximum cell_A_delay in each of $2^N$ 3-sigma process corner limits and a set of P values is a projection corner. In embodiments, the path delay is a summation of the cell delay of one or more cells, e.g., cell 'A'.

The regression analysis is then compared with a timing analysis. In this way, hardware cell parameter sensitivities can be compared with the timing methodology. The parameter sensitivities can include environmental parameters, such as temperature, voltage, and aging. In embodiments, these sensitivities are measured in sigmas of a distribution. More specifically, these environmental parameters are sized like 6 sigma ranges.

In embodiments, qualification of the timing methodology requires that the projected regression timing value including the root sum squared (RSS) of those independently random variables for best case/worst case (BC/WC) results should be within timing BC/WC limits. In embodiments, the measured performance measurements match the expected performance path measurements when qualification criteria are satisfied, i.e., the measurements do not need to exactly match one another. When the measured performance path measurements match the predicted performance path measurements, the product design is qualified and the product can be shipped to consumers, at step 340.

In contrast, when the measured performance measurements do not match the expected performance path measurements, at step the design model can be updated, e.g., redesigned, for the current product or for future chip designs. That is, the process can revert to step 300 and the model can be updated to meet timing requirements. More specifically, the timing methodology input can be updated to match the measured results, e.g., processes, timing, and/or spice models can be updated.

Figure 4:
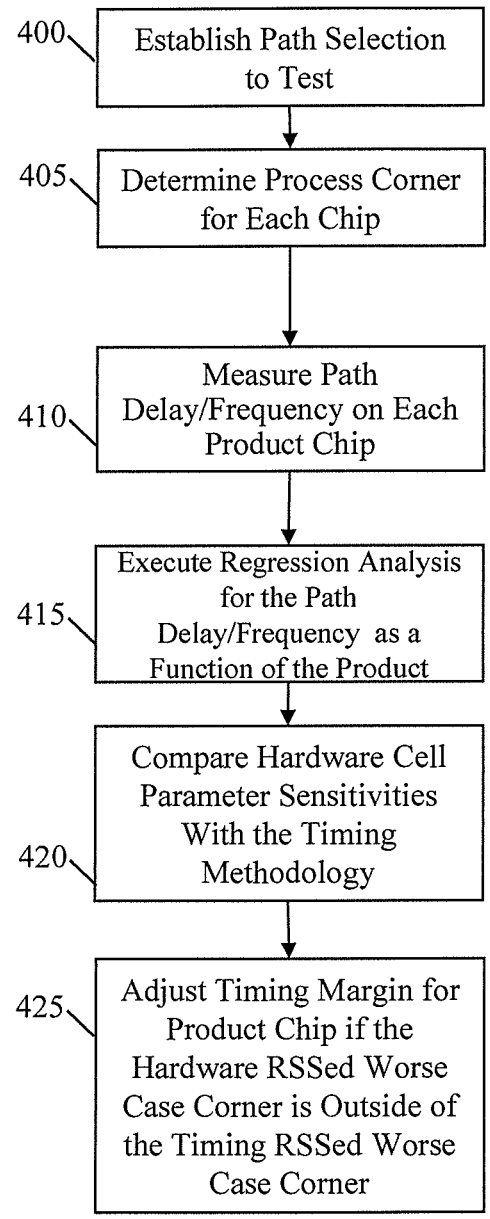

FIG. 4 depicts an exemplary flow for a process in accordance with aspects of the present invention. As shown in FIG. 4, the process includes establishing a path selection to test, at step 400. In embodiments, path selection criteria can be based on timing sensitivities of different device components, e.g., NORs, NANDs, ANDs, and Ors, and other path properties, such as high metal load, wire length per layer, a number of vias, multiple geographic locations on the chip, and a length of the path (short and long). In embodiments, data can be collected path by path, e.g., an operating threshold device of each device type (i.e., HVT, LVT, or MVT), a metal in each layer, e.g., a number and type of metal(s) used, and/or a number and type of vias used in each layer. At step 405, the process further includes determining a process corner for each chip, i.e., where a process window is run. More specifically, a value of a parameter setting for each chip to be tested is determined. Moreover, in embodiments, qualification criteria of the selected path can include voltages across an allowed operation range and/or temperatures across an allowed operation range.

As further shown in FIG. 4, the process includes, at step 410, measuring path delay/frequency on each product chip, as described herein. At step 415, a regression analysis for the path delay/frequency is executed as a function of the process window as should be understood by one of ordinary skill in the art and as described herein. The process further includes comparing hardware cell parameter sensitivities obtained from regressions with the timing methodology, at step 420. More specifically, in embodiments, sensitivities from the timing methodology and the hardware can be created and compared for each selected path using an early/late canonical model.

More specifically, in embodiments, data sensitivities are created using regression analysis based on PSRO measurements, delta PSRO measurements, scribe line metal resistance, SPM measurements, scribe line N/P ratio of Ion, threshold voltage relation, operating voltages (Vdd), and/or temperature. In embodiments, the regression analysis is conducted using a predetermined number of chips, e.g., 100 chips.

Furthermore, in embodiments, the data sensitivities obtained from regression can then be compared with sensitivities obtained from the timing methodology. Moreover, in accordance with aspects of the present invention, path delay with regression sensitivities should not be more than certain percentage (e.g., 3-5%) outside the best case and worst case values. The values exceeding such threshold can be margined in the timing methodology. In embodiments, timing sensitivity delta can be monitored such that the timing methodology does not damage, e.g., blow up, special paths. However, this can also drive additional parameter needs or margin for these special paths.

At step 425, the process also includes adjusting a timing margin setting for the product chip, e.g., the design model, when the hardware measured path data is outside the timing bound as predicted by the timing methodology. More specifically, the timing margin can be adjusted by updating processes, timing input, and/or spice models.

Figure 5:
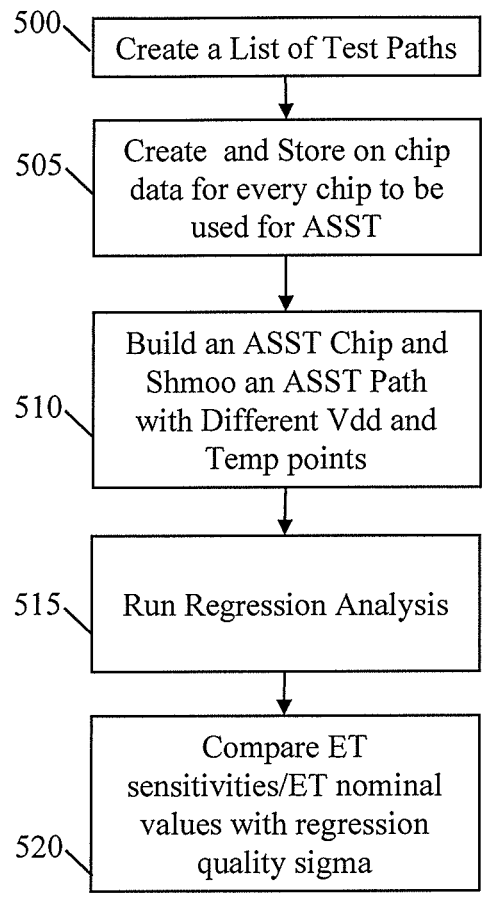

FIG. 5 depicts an exemplary flow for a process in accordance with aspects of the present invention. More specifically, as shown in FIG. 5, the process includes creating a list of test paths, at step 500. These test paths can be any path of interest on a product chip, as described herein. Moreover, these test paths can include cell, net connections, and/or wires with different process sensitivities for delay, slew, and path length. That is, these path lengths can have different N/P ratios and metal geometries per layer. At step 505, the process also includes creating and storing chip data, e.g., PSRO measurements, SPM measurements, and scribe line data for each chip to be used for the ASST. Additionally, at step 510, the process includes building an at-speed structural testing (ASST) chip and "shmooing" an ASST path with different operating voltages Vdd and temperature points. As should be understood by those of skill in the art, a Schmoo is executed by stepping a tester input and looking at the output. In the case of Performance Path Test, tester frequency is changed until the fail point of the path being tested in the product is reached.

At step 515, the process further includes running regression analysis using a predetermined number of chips, e.g., more than 100 chips, in order to determine cell based sensitivities. The cell based sensitivities can include operating voltage Vdd and temperature variations. At step 520, the process also includes comparing sensitivities and nominal values from the timing methodology with regression obtained values.

Figure 6:
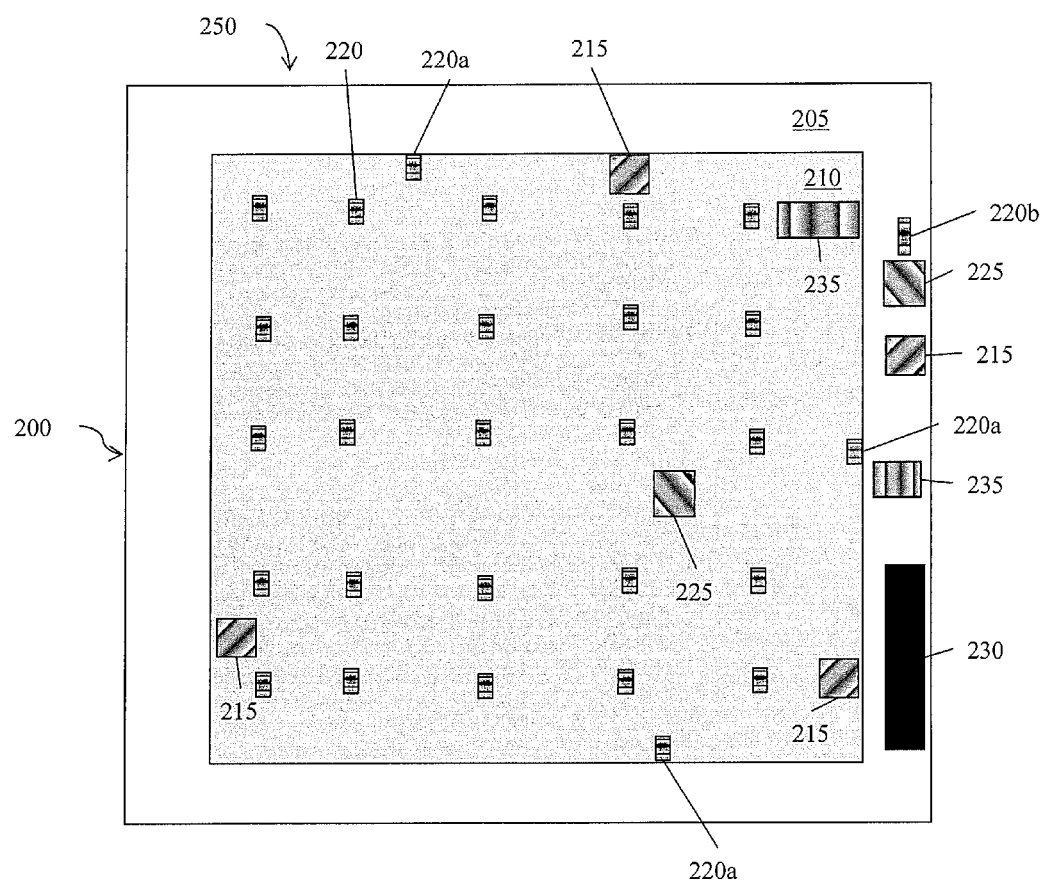
FIG. 6 shows a design layout for conducting measurements in accordance with aspects of the present invention.

FIG. 6 shows a design layout 250 for monitoring a product in accordance with aspects of the present invention. More specifically, a wafer 200 includes a chip 210 surrounded by a scribe 205 (also referred to as a kerf). In embodiments, the layout 250 includes a plurality of edge performance screen ring oscillators (PSRO) 215 placed on the chip 210. A PSRO acts as a free-running ring of memory elements passing a pulse, the output of which can be measured at a reserved chip output pin. The periodicity of the PSRO output provides a relative indication of the circuit speed, i.e., short period means faster circuit speed. PSROs are used to gauge the quality of the fabrication process, determine the speed of the circuitry on various parts of the wafer, and thereby grade the performance of individual chips on the wafer, before and after dicing.

More specifically, as shown in FIG. 6, the design layout 250 includes three edge PSROs 215 placed on the chip 210. The design layout 250 further includes a plurality of distributed PSROs 220. In embodiments, the design layout 250 can include a predetermined number (e.g., 25) of the distributed PSROs 220 built across the chip 210 in different configurations. For example, the distributed PSROs 220 may be placed across the chip 210 in substantially a grid type format (e.g., with a predetermined periodicity). Additionally, in embodiments, the layout 250 may also include three outlying distributed PSROs 220a near the scribe 205 of the chip 210 depending on the placement of active regions of the chip 210. In addition, a distributed PSRO 220b is provided in the scribe 205.

As further shown in FIG. 6, the design layout 250 includes scaling parametric measurement macros (SPM) 225. More specifically, in embodiments, an SPM 225 is provided in the scribe 205 and on the chip 210. In embodiments, the SPMs 225 can be used to measure a device threshold voltage of the scribe 205 and the chip 210 and to calculate the ratio of N to P device threshold voltage. Furthermore, in embodiments, the design layout 250 includes manufacturing kerf structures 230. In embodiments, the manufacturing kerf structures 230 can be used to measure a resistance and capacitance of devices on a selected path and a resistance of vias along the selected path. It should be understood by those of ordinary skill in the art that the design layout 250 is used for exemplary purposes only and that other test structures are also contemplated by the present invention.

Figure 7A:
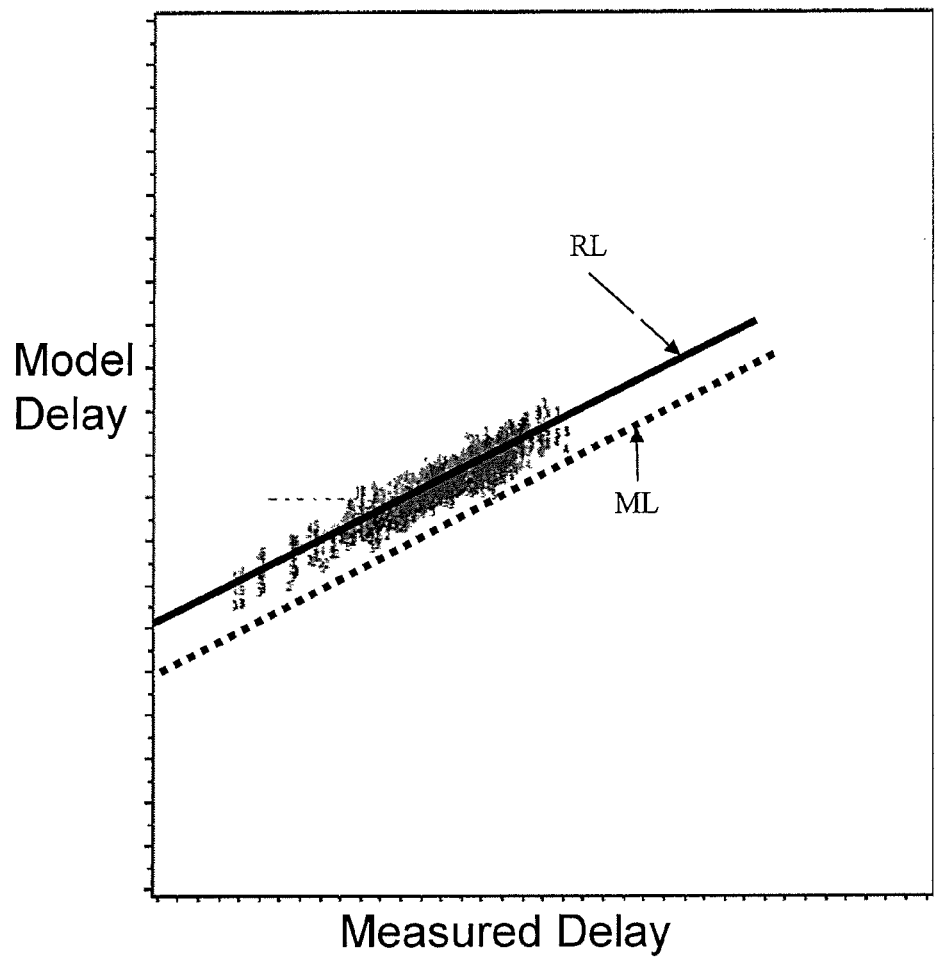
FIGS. 7A and 7B show examples of a regression line compared to a model line in accordance with aspects of the present invention.
Figure 7B:
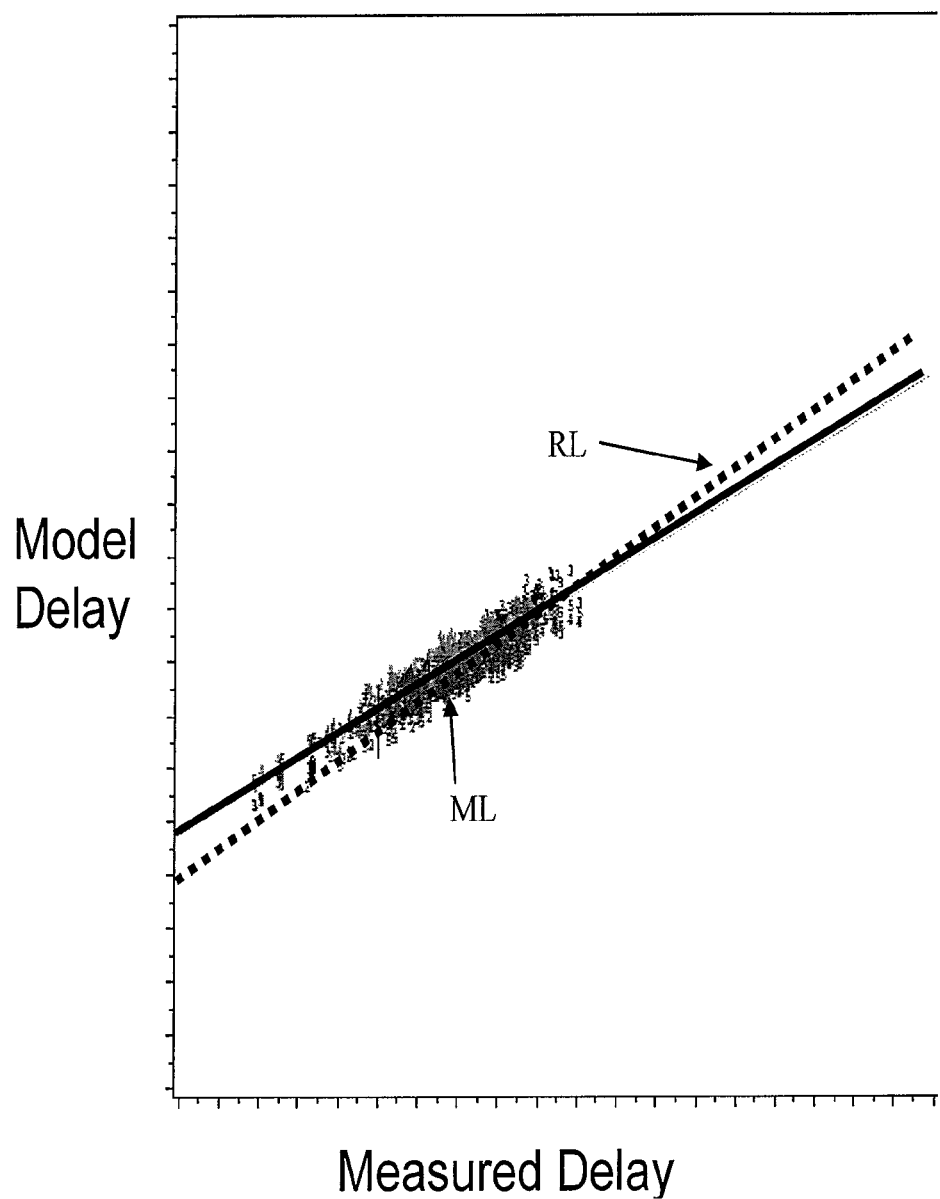

FIGS. 7A and 7B show an example regression line compared to a model line in accordance with aspects of the present invention. More specifically, a regression line RL shows expected parameters of a path and a model line ML shows measured parameters of the path. As shown in FIG. 7A, the regression line RL and the model ML are not in alignment with one another. As such, the measured parameters do not meet the expected parameters. In contrast, FIG. 7B shows the regression line RL and the ML aligned with one another. That is, the measured parameters match the expected parameters, as described herein. In this way, the regression line can be used to demonstrate inaccuracies in the model, i.e., variations in the path of a cell.

The methods as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method, comprising:
    designing a product using a model from an initial test site;
    creating performance path tests for one or more paths on the product;
    measuring performance path parameters of the product; and
    determining that the measured performance path parameters match predicted performance path parameters,
    wherein the determining that the measured performance path parameters match predicted performance path parameters comprises:
    conducting a regression analysis;
    inputting identified sensitivity input into a canonical model; and
    comparing the regression analysis with a timing analysis.

2. The method of claim 1, wherein the product comprises structures used to conduct parametric measurements.

3. The method of claim 1, wherein the creating the performance path tests comprises determining at least one of a path delay and a frequency of a selected path as a function of a process window sigma for the at least one of the path delay and the frequency.

4. The method of claim 3, wherein the determining at least one of the path delay and the frequency of a selected path as a function of a process window sigma provides the expected performance path parameters.

5. The method of claim 1, further comprising determining a process window sigma for each die of the product.

6. The method of claim 1, wherein the comparing the regression analysis with the timing analysis comprises comparing chip parameter sensitivities with a timing methodology.

7. The method of claim 6, wherein the chip parameter sensitivities comprise both process parameters and environmental parameters including temperature, voltage, and aging.

8. The method of claim 7, wherein the chip parameter sensitivities are measured in sigmas of a distribution.

* * * * *